(12) United States Patent
Abgrall et al.

(10) Patent No.: US 9,154,550 B1
(45) Date of Patent: Oct. 6, 2015

(54) METHODS AND SYSTEMS FOR DETERMINING, CONTROLLING, AND REPORTING NETWORK DATA USAGE AT THE APPLICATION AND FEATURE LEVEL

(71) Applicant: Google Inc., Mountain View, CA (US)

(72) Inventors: JP Abgrall, Santa Clara, CA (US); Ashish Sharma, Mountain View, CA (US); Jeff Allen Sharkey, Mountain View, CA (US); Michael Gerard Morrissey, Atlanta, GA (US); Daniel Marc Gatan Shiplacoff, Los Altos, CA (US); Gabriel Cohen, Alameda, CA (US)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 13/653,340

(22) Filed: Oct. 16, 2012

Related U.S. Application Data

(60) Provisional application No. 61/548,189, filed on Oct. 17, 2011, provisional application No. 61/611,697, filed on Mar. 16, 2012.

(51) Int. Cl.
*G06F 15/173* (2006.01)
*H04L 29/08* (2006.01)
*H04L 12/801* (2013.01)

(52) U.S. Cl.
CPC ............ *H04L 67/1002* (2013.01); *H04L 47/19* (2013.01)

(58) Field of Classification Search
CPC ..................... H04L 47/19; H04L 67/1002
USPC ................. 709/206, 224, 225; 715/772
See application file for complete search history.

(56) References Cited

U.S. PATENT DOCUMENTS

| 8,484,568 B2 * | 7/2013 | Rados et al. ............ 715/745 |
| 2002/0083003 A1 * | 6/2002 | Halliday et al. ............ 705/52 |
| 2007/0081543 A1 * | 4/2007 | Brenes et al. ............ 370/401 |
| 2012/0195223 A1 * | 8/2012 | Raleigh .................... 370/252 |

OTHER PUBLICATIONS

JP Abgrall et al., "Methods and Systems for Determining and Controlling Network Data Usage at the Application and Feature Level", U.S. Appl. No. 13/653,307, filed Oct. 16, 2012.

* cited by examiner

*Primary Examiner* — Yves Dalencourt
(74) *Attorney, Agent, or Firm* — Faegre Baker Daniels LLP

(57) ABSTRACT

An operating system (OS) of a computing device can include or operate in conjunction with a data usage service. The data usage service can determine the network data usage of applications and features of the applications and attribute the network data usage to the specific application and features of the specific application responsible for the network data usage. The data usage service can utilize the determined network data usage and policies governing network data usage to control and adapt the network data usage of the specific application or the features of the specific application.

21 Claims, 16 Drawing Sheets

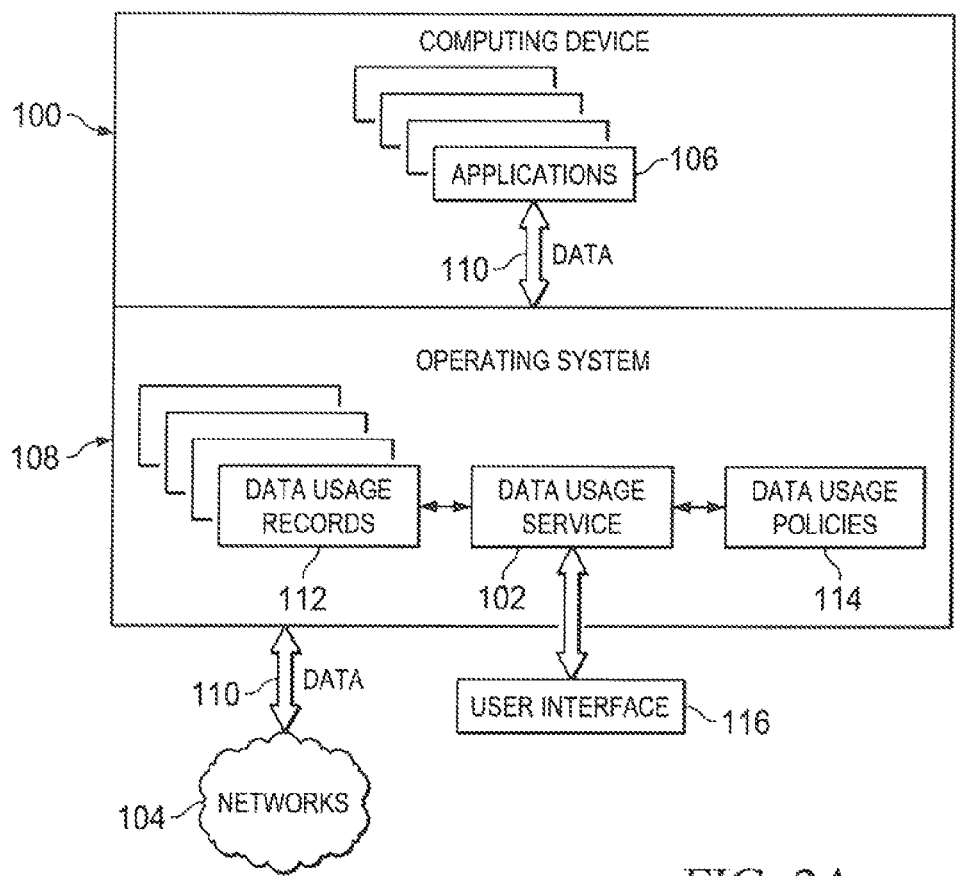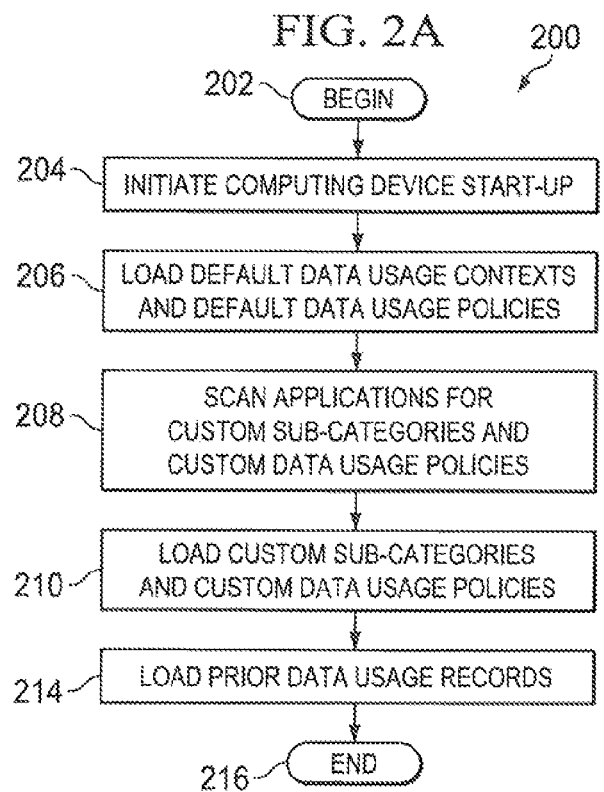

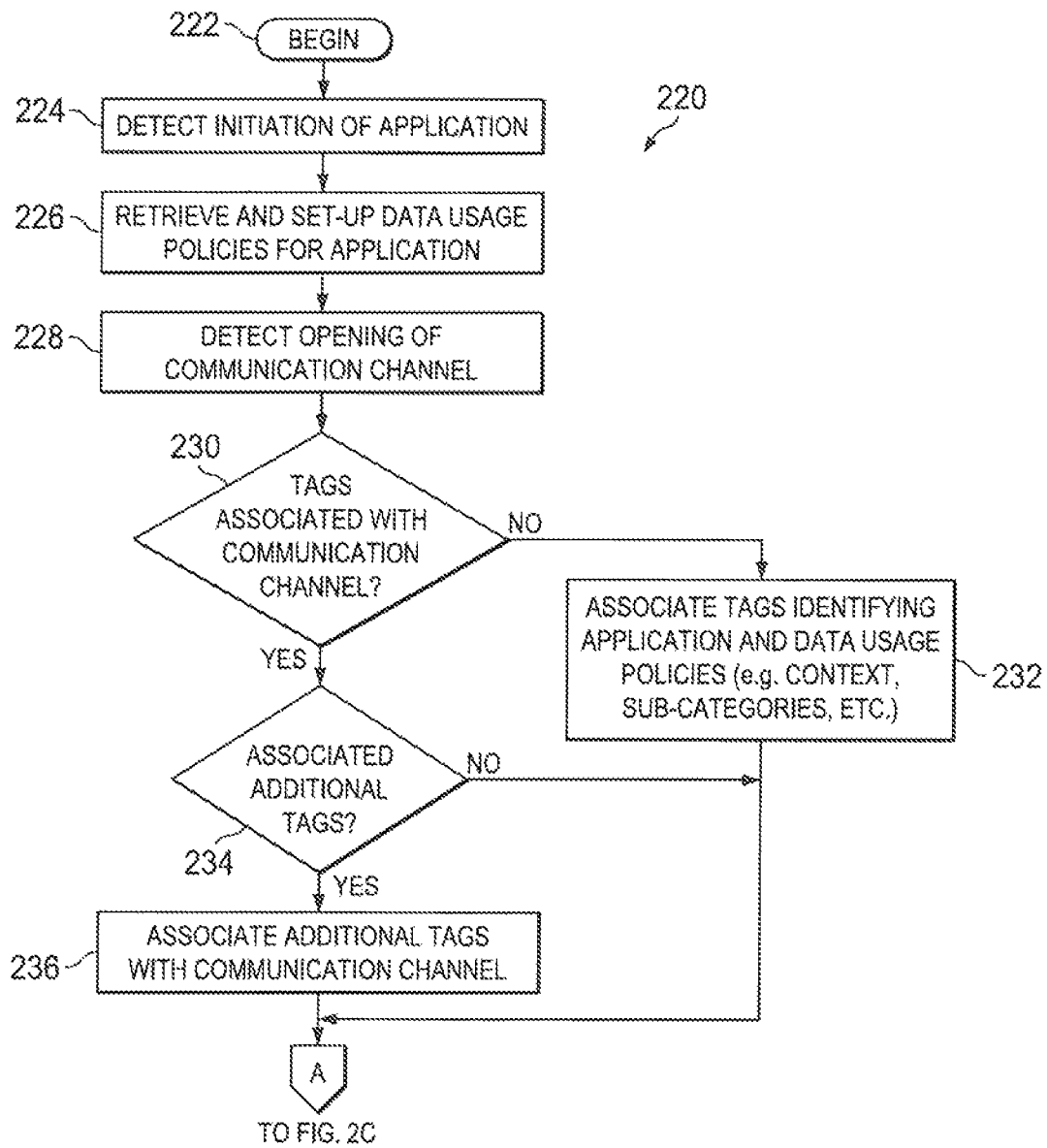

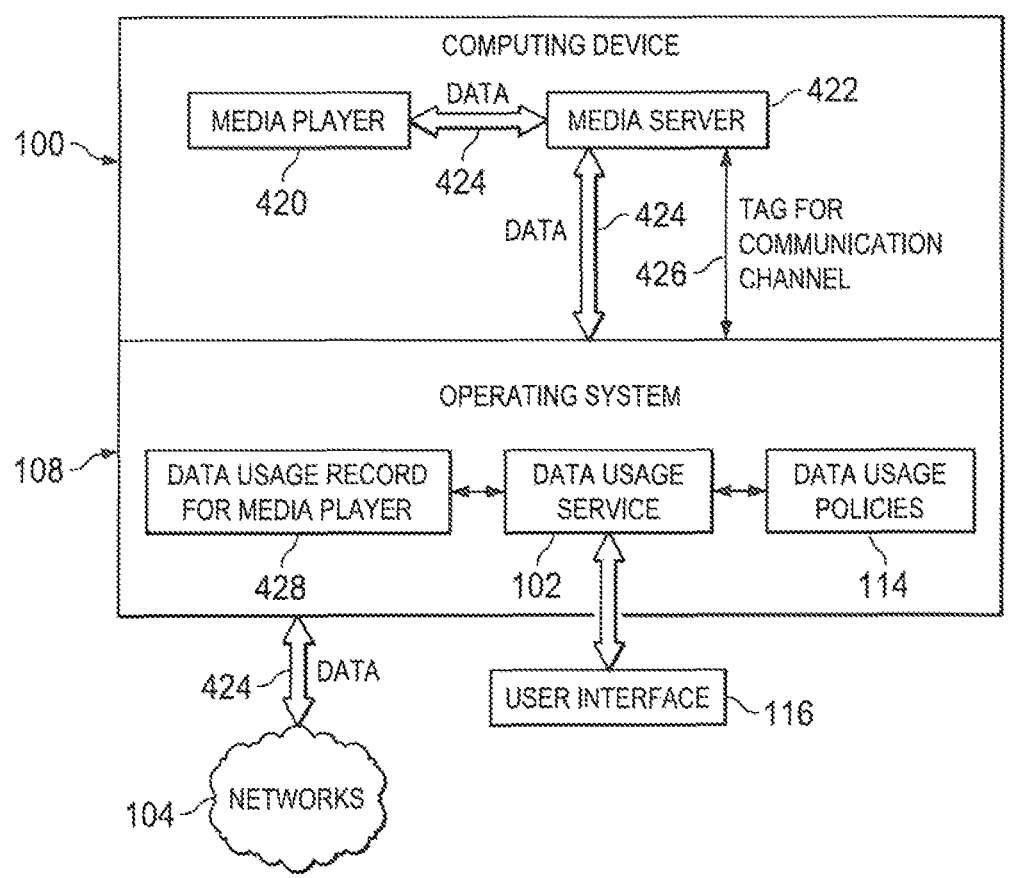

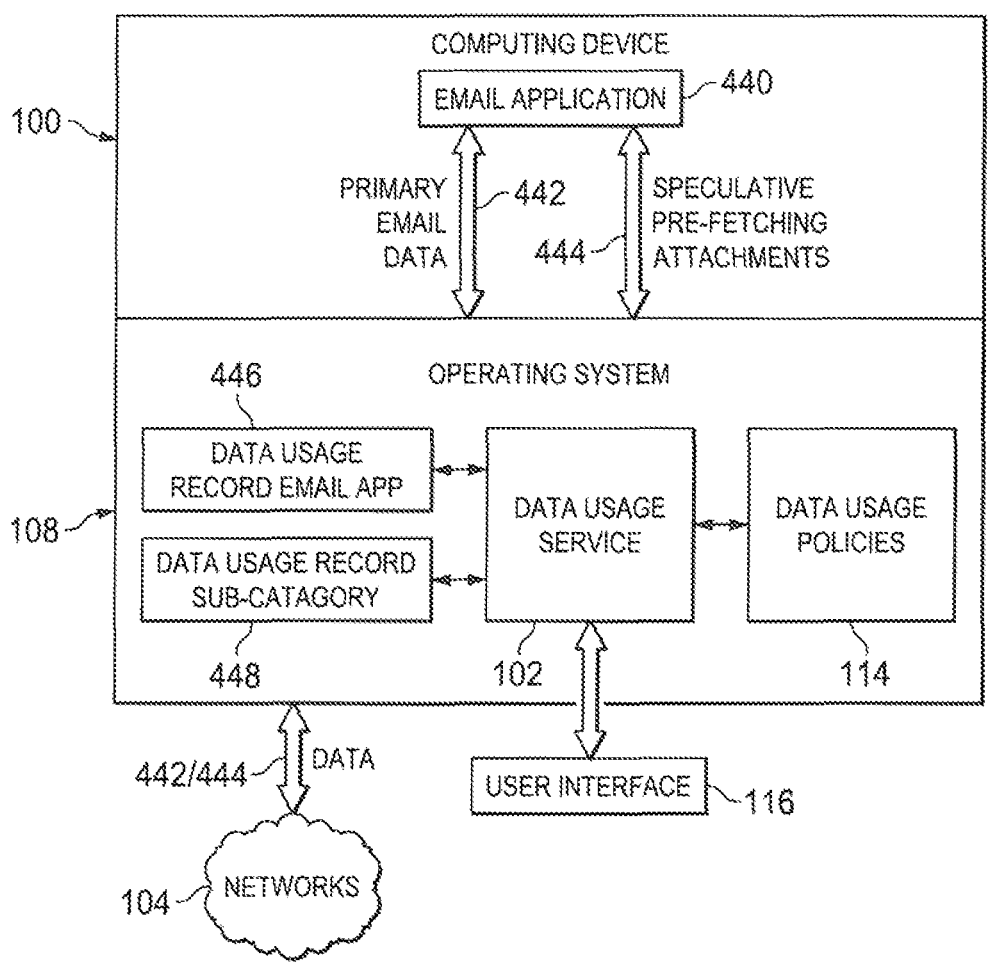

METHODS AND SYSTEMS FOR DETERMINING, CONTROLLING, AND REPORTING NETWORK DATA USAGE AT THE APPLICATION AND FEATURE LEVEL

CROSS-REFERENCE TO RELATED APPLICATIONS

This application claims priority from U.S. Provisional Patent Application Ser. Nos. 61/548,189, filed Oct. 17, 2011 and 61/611,697, filed on Mar. 16, 2012, both of which is hereby incorporated by reference in their entirety.

FIELD

This disclosure relates generally to determining, controlling, and reporting the usage of network data bandwidth in computing devices.

BACKGROUND

The classification of network data flows on the Internet backbone has helped provide an insight into the trends of network usage over time based on applications, devices, geographies, and network types. Such efforts to study and control the network usage behavior relate to and are often aggregated over a large number of users on the Internet. Current computing devices, however, do not provide fine-grained visibility and control of network usage patterns on individuals computing device where the network data flows originate.

Today, the use of networks to exchange data is growing at a rapid pace. For example, mobile devices, such as cellular telephones, tablet computers, laptops, etc., are increasingly using wireless networks to send and receive data. In the past, wireless network providers allowed unlimited data plans that charged a flat rate for sending and receiving data over the wireless network. The explosive growth in the data transmitted over the wireless network by mobile devices has led to the replacement of unlimited data plans with pay-per-use plans. These pay-per-use plans require that the users of the mobile devices pay by bandwidth used, for example, by the rate for GigaBytes (GB) per Month for typical cellular telephone plans and the rate for MegaBytes (MB)/Hour for WiFi hotspots. This move towards pay-per-use plans has adversely affected users because of the overage charges that are incurred when a user unexpectedly exceeds the monthly quota of download and upload limits.

More and more applications, e.g. social networking, online gaming, news/weather, used by mobile devices rely on sending and receiving data over the wireless networks. Some applications may cause excessive usage of the network, and, thus, cause the user to incur large and sometimes unexpected charges. Some governments are imposing rules that require wireless network providers to warn the user when such limits are being approached or exceeded. But from the user's perspective, it is not clear which application or feature of the application is causing the data usage in the wireless network.

The problem of attributing the data usage of an application is further complicated by the fact that sometimes separate applications, e.g. a mediaserver, download manager, or the operating system (OS) on the mobile device provide a network data exchange service to the application. To correctly account for data usage by the application, it becomes important to correctly attribute data usage to the application requesting the network data exchange service, and not the separate application providing the network data exchange service. Likewise, to control data usage, limits need to be imposed on the application requesting the network data exchange service, and not the separate application providing the network data exchange service.

Conversely, from an application developer's point of view, it is important to profile the data usage of their application. Because data exchanged over the network has an associated overhead in terms of the system setup costs (e.g. battery and cpu usage) and protocol overheads at each layer of the networking stack (e.g. hypertext transfer session (HTTP) session, transmission control protocol (TCP) handshake, and transmission control protocol/internet protocol (TCP/IP) headers for each packet), the ability to profile, control, and adapt the behavior of an application based on a data usage can be extremely useful for application developers. Applications, however, can themselves not determine how much data they are using, as the payload they want to transfer actually incurs an overhead caused by the protocols used. For example, some applications will request a secure HTTP (HTTPS) connection to a server, but the applications cannot determine how much extra data is used to establish a secure connection. Likewise, applications will use a connection for different types of transfers which don't all have the same importance, for example, speculatively pre-fetching the attachments of unread emails versus getting the actual subject lines needed to notify the user of an available email. In all these cases, it is difficult for the developer to know which parts of the application need to avoid costly traffic, and difficult for the end user to apply limitations on specific portions of an application's traffic.

Some OSes, e.g. Unix and Linux derived OSes, offer network filtering and quota handling at a coarse level. The OSes allow determining on specific networking interfaces, set quota limits that cut off traffic on the interfaces, allow filtering specific users, and specific protocols. Additionally, on mobile devices, some tools exist that will determine data usage globally for all applications as a whole. Data usage selecting/notifying apps can then disable access to the network for all applications when a certain quota is exceeded by all the applications combined. But, none of the these tools and applications are able to distinguish which application or part of an application is causing the data usage, and when those applications are using services like Download Managers. Due to this ambiguity, tools and applications cannot attribute the data usage to a specific application or parts of the applications. Accordingly, it impossible to set a quota on a specific application and on specific parts of the applications.

This inability to attribute network data usage exists for any type of computing device running applications whether mobile computing devices or other types of computing devices such as a desktop computer, a set-top box, a gaming console, etc. Likewise, the need to track data usage can apply to any type of computing device and to any network whether wireless or wired.

Accordingly, there is a need for determining, controlling, adapting, and reporting data usage for specific application and features of applications that are running on computing devices and exchanging data with networks.

SUMMARY

Embodiments of the present teachings relate to a method for determining and controlling network data usage in a computing device. The method can include receiving a request to establish a connection across a network by an application executing on the computing device and identifying a communication channel of the connection that is associated with a tag, wherein the tag identifies the application or features of the application and identifies a policy governing data being exchanged over the network. The method can also include determining an amount of data received by the communication channel and storing the amount of the data received in a record associated with the tag. Additionally, the method can include providing a user interface that displays the amount of data stored in the record.

Embodiments of the present teachings also relate to a computer readable storage medium embodying instructions for causing a processor to perform a method. The method can include receiving a request to establish a connection across a network by an application executing on a computing device and identifying a communication channel of the connection that is associated with a tag, wherein the tag identifies the application or features of the application and identifies a policy governing data being exchanged over the network. The method can also include determining an amount of data received by the communication channel and storing the amount of the data received in a record associated with the tag. Additionally, the method can include providing a user interface that displays the amount of data stored in the record.

Embodiments of the present teachings also relate to a computing device for determining and controlling network data usage. The computing device can include a processor and a computer readable storage medium coupled to the processor. The computer readable storage medium can include instructions for causing the processor to perform a method. The method can include receiving a request to establish a connection across a network by an application executing on the computing device and identifying a communication channel of the connection that is associated with a tag, wherein the tag identifies the application or features of the application and identifies a policy governing data being exchanged over the network. The method can also include determining an amount of data received by the communication channel and storing the amount of the data received in a record associated with the tag. Additionally, the method can include providing a user interface that displays the amount of data stored in the record.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 1 is a generic block diagram that illustrates a computing device that includes a data usage service according to embodiments of the disclosure.

FIGS. 2A-2E are flow diagrams that illustrate exemplary processes that can be performed by the data usage service according to various embodiments of the disclosure.

FIGS. 4A-4C are generic block diagrams that illustrate several examples of determining and controlling the network data usage by the data usage service according to various embodiments of the disclosure.

DETAILED DESCRIPTION

Figure 2C:
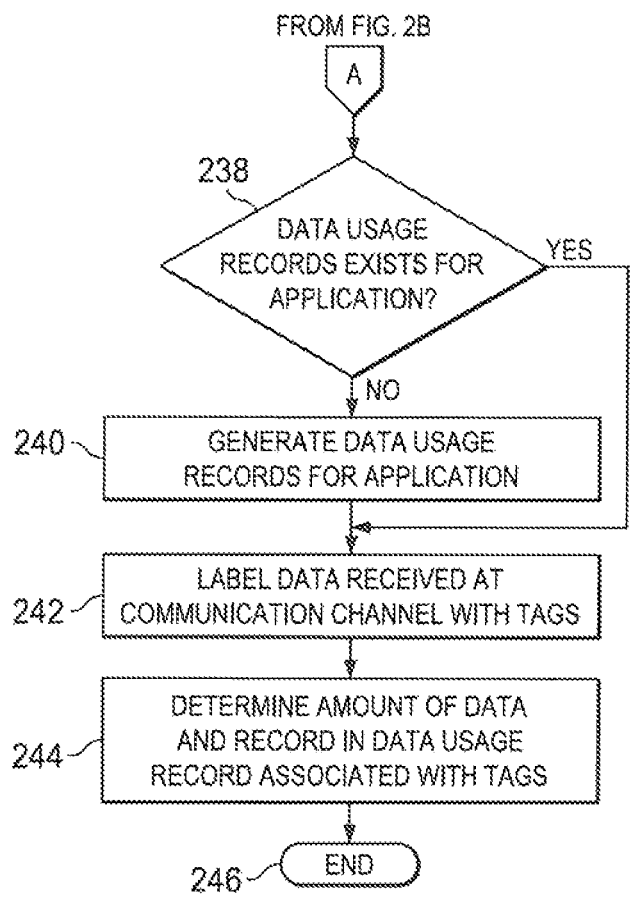

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for determining, profiling, controlling, adapting, and reporting network data usage and associated cost in an intelligent and granular fashion. According to embodiments, an operating system (OS) of a computing device can include or operate in conjunction with a data usage service. The data usage service can determine the network data usage of applications and features of the applications and attribute the network data usage to the specific application and features of the specific application responsible for the network data usage. By determining the network data usage to specific applications and features of the specific applications, the data usage service can obtain a true picture of the network usage by the applications of the computing device. Likewise, the data usage service can control and adapt the network data usage of specific applications to prevent overages in network data usage while allowing greater flexibility in data usage by important or desired application or features. Additionally, the user of a computing device can obtain a complete picture of data usage by applications and features of applications on the computing device.

FIG. 1 illustrates a computing device 100 that includes a data usage service 102, which can determine, profile, control, adapt, and report data usage associated with networks 104, according to various embodiments. While FIG. 1 illustrates various components contained in the computing device 100, one skilled in the art will realize that FIG. 1 is exemplary and that additional components can be added and existing components can be removed.

As illustrated, the computing device 100 can be any type of computing device that can run and execute applications 106. For example, the computing device 100 can be a cellular telephone, a personal digital assistant, a tablet computer, a media player device, a laptop computer, a thin client computer, a desktop computer, a server computer, a set-top box (e.g. cable or satellite), a game console, or other conventional computing devices. The computing device 100 can include hardware found in conventional computing devices, such as one or more processors, computer readable storage media (e.g. volatile and non-volatile memory), network hardware (e.g. wired network cards, wireless networks cards, radio receivers and transmitters), video hardware, and input/output hardware.

The computing device 100 can communicate with the networks 104 utilizing the network hardware of the computing device 100. The networks 104 can be any types of networks, whether wired or wireless, that supports the exchange of data between computing devices. While the following description describes that computing device 100 can communicate with multiple networks, one skilled in the art will realize that the computing device 100 can communicate with any number of networks whether one or more.

The computing device 100 can store and execute an operating system (OS) 108. The OS 108 can include one or more software programs and modules that manage the hardware resources of the computing device 100. The OS 108 can provide common services for the applications 106. The OS 108 can be any type of known proprietary and/or open-source operating system that can be stored on one or more of the computer readable storage media of the computing device 100 and that can be executed by the computing device 100.

During execution, the applications 106 can connect to one or more of the networks 104 and exchange data with the networks 104. For example, an email application can send and receive emails via one or more of the networks 104; a web browser application can access websites via one or more of the networks 104; a media player can download media files via one or more of the networks 104; and the like.

Due to various reasons, the computing device 100, a user of the computing device 100, or both can desire to determine and control the usage of one or more of the networks 104 by the applications 106 to send and receive data. For example, if the computing device 100 is charged a fee for exchanging data with one or more of the networks 104, the computing device 100 or a user of the computing device 100 can desire to determine and control the network data usage of the applications 106 in order to identify and control the cost of using the networks 104. Likewise, for example, the computing device 100 or a user of the computing device 100 can desire to determine and control the network data usage of the applications 106 to optimize the connections to the networks 104 for the applications 106. One skilled in the art will realize that the computing device 100 and users of the computing device 100 can desire to determine and control network data usage for any number of reasons.

According to embodiments, the computing device 100 can include a data usage service 102. The data usage service 102 can determine the network data usage of applications 106 and features of the applications 106 when exchanging data with the networks 104. The data usage service 102 can attribute the network data usage to the applications 106 and features of the applications 106 responsible for the network data usage. By determining the network data usage of the applications 106 and features of the applications 106, the data usage service 102 can obtain a true picture of the network usage by the applications 106 running on the computing device 100. Likewise, the data usage service 102 can control and adapt the network data usage of the applications 106 and features of the applications 106 to prevent overages in network data usage while allowing greater flexibility in network data usage by the applications 106. Additionally, the users of the computing device 100 can obtain a complete picture of network data usage by the applications 106 and features of the applications 106 when exchanging data with the networks 104.

The data usage service 102 can be implemented as one or more software programs, modules, or both that are configured to be executed by the computing device 100 to perform the processes as described herein. The data usage service 102 or parts of the data usage service 102 can be implemented as a portion of other software programs, such as the OS 108. Likewise, the data usage service 104 or parts of the data usage service 102 can be implemented as stand-alone software programs, modules, or both. In any implementation, the data usage service 102 can be configured to include the necessary logic, commands, instructions, and protocols to perform the processes described herein. In any implementation, the data usage service 102 can be written in any type of conventional open-source and/or proprietary programming language. Copies of the data usage service 102 can be stored on one or more of the computer readable storage media of the computing device 100.

According to embodiments, the data usage service 102 can determine, control, and adapt an overall network data usage of one or more of the applications 106 and features of the applications 106. The data usage service 102 can uniquely associate a communication channel used by the applications 106 or features of the applications 106 with: an identification of the applications 106 and features of the applications 106, and any policies that govern the applications' 106 and features' network data usage. The communication channel can be any type of logical communication channel that the applications 106 utilize to exchange data with the networks 104. For example, the communication channels can be network sockets used by the applications 106 or other levels of application programming interface (API) abstractions.

When an application 106 and features of the application 106 requests a network connection to one of the networks 104, the data usage service 102 can associate one or more tag with a communication channel created for the application 106 and the features of the application 106 to exchange data 110 over the network connection. The one or more tags can uniquely identify the application 106 and the features of the application 106 and any policies that govern the application's 106 or feature's network data usage.

When the data 110 is received at the communication channel, the data usage service 102 can label the data 110 with one or more tags associated with the communication channel. The data usage service 102 can then determine an amount of the data 110 received at the communication channel and record the amount of the data 110 in one or more data usage records 112 associated with the one or more tags. The same procedure can be performed for each of the applications 106 or features of the applications 106 as each of the applications 106 or features of the applications 106 requests a network connection, and a communication channel is created. As such, the data usage service 102 can identify and determine the network data usage by each of the applications 106 or features.

According to embodiments, the data usage records 112 can be any type of data structure that can be associated with a tag and the one or more networks 104 used to exchange data and that can store the amount of the data 110 exchanged with the networks 104. The data usage records 112 can be stored on one or more of the computer readable media of the computing device 100.

According to embodiments, a policy governing network data usage (data usage policy), utilized by the data usage service 102, can include any information necessary to identify a condition present in an application's 106 network data usage or feature's network data usage and one or more actions to take once the condition occurs. The data usage policy can include an identification of one or more of the networks 104 subject to the policy, a condition in the network data usage that invokes the data usage policy, and one or more actions to take in response to the condition. The condition can be any condition occurring in the network data usage for one or more of the networks 104, for example, any network data usage, a defined amount of network data usage, and the like. The condition, for example, can be a quota that specifies an amount of network data usage within a period of time. For example, a quota can specify MBytes used per day, MBytes user per week, GBytes used per month, and the like. The action, taken in response to the condition, can be any action associated with an application's 106 network data usage, a feature's network data usage, or both. For example, the action can include blocking or limiting an application's 106 or feature's use of one or more of the networks 104, altering the rate at which the application 106 or the feature can exchange data with one or more of the networks 104, altering the quality of service of the connection to one or more of the networks 104, switching the application's 106 or feature's connection to different ones of the networks 104.

According to embodiments, the data usage service 102 can maintain the data usage policies in a data usage policies record 114. The data usage policies record 114 can be any type of data structure that can store the data usage policies. The data usage policies record 114 can be stored on one or more of the computer readable media of the computing device 100.

According to embodiments, the data usage service 102 can control and adapt the data usage of the applications 106 and features of the applications 106 using the amount of network data usage recorded in the data usage records 112 and using the data usage policies record 114. When the data usage is recorded for an application 106, features of the application 106, or both, the data usage service 102 can compare the amount of data recorded in the data usage records 112, for the application 106, features, or both, to the data usage policies that govern the application's 106 or features network data usage, which are stored in the data usage policies record 114. If the amount of network data usage meets a condition specified in the data usage policies, the data usage service 102 can perform the one or more actions that are specified in the policy. Accordingly, the data usage service 102 can control and adapt the activities of the applications 106 and the features of the applications 106 based on conditions occurring in the network data usage.

According to embodiments, the data usage service 102 can provide notifications, such as warning and alerts, that the condition has occurred and an action has been taken. The data usage service 102 can also provide notifications on a current level of network data usage by the applications 106 and the features of the application 106. The data usage service 102 can generate a user interface 116 to provide the notification and receive information from the user of the computing device 100. In implementation, the data usage service 102 can notify the application 106, and the application 106 can generate the user interface 116. The user interface 116 can be any type of interface that can provide information to the user and receive information from the user, such as a graphical user interface (GUI), and command line interface, and the like. The data usage service 102 can provide the user interface 116 in a display device of the computing device 100. While FIG. 1 illustrates a single user interface 116, one skilled in the art will realize that the data usage service 102 can generate and provide any number of user interfaces.

In addition to determining and controlling the overall data usage, the data usage service 102 can classify and determine the applications 106 based on a context. The context can be related to the manner within which the applications 106 execute on the computing device 100, to the network which the application is utilizing to exchange data, to activities being performed by the applications 106, to user defined situations, or combinations of these contexts. For example, a context can be related to whether a specific application 106 is executing in the foreground or background, or has been singled out by a user. Likewise, for example, a context can be related to each of the networks 104 with which the application 106 can utilize to send and receive data. When an application 106 requests a network connection, the data usage service 102 can associate a tag with the communication channel created for the application 106 that can uniquely identify the application 106 and the context of the application 106.

When the data 110 is received at the communication channel, the data usage service 102 can label the data 110 with the tag associated with the communication channel. The data usage service 102 can then determine the amount of data being communicated over the communication channel and record the amount of data in one or more of the data usage records 112 associated with the tag, which identifies both the application 106 and the context. If the application 106 switches context, the data usage service 102 can determine and separately store the amount of network data usage in a record of the data usage records 112 that is associated with the context within which the network data usage occurred. Accordingly, the data usage service 102 can determine the overall data usage of the application 106 as well as the network data usage in each context.

Likewise, the data usage service 102 can provide notifications that identify the overall data usage of an application 106 as well as data usage in any relevant context associated with the application 106. For example, the data usage service 102 can provide the notifications in the user interface 116.

According to embodiments, the policies governing data usage can be associated with different contexts. When identifying policies to be associated with an application 106, the data usage service 102 can utilize the context associated with the application to identify which data usage policies should be applied to the application's 106 data usage determined by the data usage service 102. As such, the data usage service 102 can determine and control data usage based on the specific context of an application 106.

As discussed above, in addition to determining and controlling the network data usage of an application 106, the data usage service can determine, control, adapt, and report the network data usage of features of the application 106. The data usage service 102 can utilize sub-categories that identify the different features of each of the applications 106. To determine the network data usage, the data usage service 102 can associate a tag with the communication channel that identifies the application 106 and any policies that govern the application's 106 network data usage, and can associate the communication channel with a separate tag that identifies a sub-category for the feature using the communication channel and any policies that govern the feature's network data usage.

When the data 110 is received at the communication channel, the data usage service 102 can label the data 110 with all the tags associated with the communication channel. The data usage service 102 can then determine the amount of data received at the communication channel and record the amount of data usage in separate records in the data usage records 112 associated with the each tag, e.g. a record in the data usage records 112 showing data usage by the application 106 and a record in the data usage records 112 showing data usage by the feature of the application 106.

If a different feature classified under a different sub-category provides the data 110 to the communication channel, the data usage service 102 can associate the communication channel with a tag that identifies the application 106 and any policies that govern the application's 106 network data usage, and can associate the communication channel with a new tag that identifies a different sub-category for the different feature using the communication channel and any policies that govern the different feature's network data usage. Accordingly, the data usage service 102 can determine both the overall network data usage of each of the applications 106 as well as the network data usage by each feature of the applications 106. Further, the data usage service 102 can control and adapt the network data usage by each feature of each of the applications 106.

According to embodiments, the data usage service 102 can provide notification of the applications' 106 overall network data usage and network data usage by each feature. The data usage service 102 can provide the notification in the user interface 116.

According to embodiments, the data usage service 102 can utilize both context and sub-categories as well as other attributes, to determine, control, adapt, and report the network data usage of each of the applications 106 and the features of the application 106. The data usage service 102 can determine and record the network data usage for each of the applications 106, the context of each of the applications 106, and the sub-categories for the features of the applications 106. Accordingly, the data usage service 102 can provide an overall and detailed view of the network data usage of the applications 106.

According to embodiments, when determining network data usage, the data usage service 102 can automatically associate the tags with the communications channel and vice versa. Likewise, the applications 106 can communicate with the OS 108 to associate tags with the communications channel. As such, the applications 106 that provide network services to other ones of the applications 106 can properly attribute the network data usage to the correct application. In implementations, the application 106 can request that the data usage service 102 update the data 112 to properly attribute the network data usage to the correction application after data 110 has already been processed.

According to embodiments, the different contexts and data usage polices associated with the different contexts can be predefined by the data usage service 102. Likewise, for each predefined context, the data usage service 102 can allow a user of the computing device 100 to set the data usage policies for the predefined context. For example, the data usage service 102 can allow a user to identify network 104 subject to a data usage policy, the conditions of the policy, and the action to take if the conditions occurs. Additionally, the data usage service 102 can allow a user of the computing device 100 to set the policies governing network data usage for any of the applications 106 and features of the applications 106. Accordingly, the data usage service 102 can allow users to control the network data usage of the applications 106, features of the application 106, and any of the applications 106 associated with a context.

According to embodiments, the sub-categories associated with features of the applications 106 can be defined by a developer of the applications 106. When determining and controlling network data usage in the application 106, the data usage service 102 can identify the sub-categories by examining the applications 106. Accordingly, developers of the applications 106 can specify and define the features of the application 106 for which the network data usage is determined and controlled by the data usage service 102.

FIGS. 2A-2E illustrate exemplary processes that can be performed by the data usage service 102 in order to determine, control, adapt, and report network data usage in the computing device 100, according to various embodiments. While FIGS. 2A-2D illustrate various processes that can be performed by the data usage service 102, one skilled in the art will realize that any of the processes and stages of the processes can be performed by other components of the computing device 100. Likewise, one skilled in the art will realize that the illustrated stages of the processes are exemplary and that any of the illustrated stages can be removed, additional stages can be added, and the order of the illustrated stages can be changed.

FIG. 2A illustrates an exemplary process 200 that can be performed when the computing device 100 starts-up in order to initiate determining, controlling, adapting, and reporting network data usage, according to various embodiments. In 202, the exemplary process 200 can begin. The exemplary process 200 can begin in response to power-up of the computing device 100, to a restart of the computing device 100, and the like.

In 204, the OS 108 can initiate start-up of the computing device 100. The OS 108 can load and can initiate the software programs, modules, and applications necessary to allow operation of the computing device 100. The OS 108 can also load and initiate the data usage service 102.

In 206, the data usage service 102 can load default data usage contexts and default data usage policies. The data usage service 102 can retrieve the data usage policies record 114 and load the data usage policies record 114 for use in determining, adapting, controlling, and reporting the network data usage of the applications 106.

In 208, the data usage service 102 can scan the applications 106 for custom sub-categories and custom data usage policies. The applications 106 can specify custom sub-categories and custom data usage policies for the features of the applications. The data usage service 102 can scan the applications 106 to identify the custom sub-categories and the custom data usage policies.

In 210, the data usage service 102 can load the custom sub-categories and custom data usage policies. The data usage service 102 can store the custom sub-categories and the custom data usage policies in the data usage policies record 114.

In 214, the data usage service 102 can load prior data usage records 112. For example, prior to a shut down or restart, the data usage service 102 may have determined the network data usage of one or more of the applications 106 and the features of the applications 106. As such, the data usage service 102 can store the amount of network data usage in the data usage records 112, retrieve the previous values, and load the data usage records 112 with the previous value. In 216, the exemplary process 200 can end, return to any point or repeat.

FIGS. 2B and 2C illustrate an exemplary process 220 that can be performed by the data usage service 102 to determine network data usage according to various embodiments. In 222, the exemplary process 220 can begin.

In 224, the data usage service 102 can detect the initiation of an application 106. The application 106 can be initiated by a user of the computing device 100 or by the computing device 100, itself. In 226, the data usage service 102 can retrieve and set-up data usage policies for the application 106. The data usage service 102 can access the data usage policies record 114 to set-up the data usage policies for the application 106 and any features of the application 106.

In 228, the data usage service 102 can detect the opening of a communication channel. For example, when accessing one or more of the networks 104, the application 106 (or the OS 108) can open a communication channel to allow the exchange of data with the one or more networks 104. The communication channel can be any type of logical communication channel that the application 106 utilizes to exchange data with the networks 104. For example, the communication channels can be network sockets used by the application 106 or other levels of API abstractions.

In 230, the data usage service 102 can determine if one or more tags are associated with the communication channel. For example, the application 106 or another application 106 can associate the tags with the communication channel. For instance, the application 106 can utilize an intermediate application to access the networks 104, and the intermediate application can associate the tags with the communication channel. If no tags are associated with the communications channel, in 232, the data usage service 102 can associate the tags with the communication channel. The tags can identify the application 106, any relevant contexts, any relevant sub-categories, and any relevant data usage policies.

In 234, if one or more tags are already associated with the communication channel, the data usage service 102 can determine if additional tags should be associated with the communication channel. In 236, the data usage service 102 can associate the additional tags with the communication channel. For example, if an intermediate application assigned a tag identifying the application 106, the data usage service 102 can associate additional tags that identify any relevant contexts, any relevant sub-categories, and any relevant data usage policies, which were not associated by the intermediate application.

In 238, the data usage service 102 can determine if data usage records exist for the application 106. The data usage service 102 can examine the data usage records 112 to determine if records exist that match the tags associated with the communication channel. If the records do not exist, in 240, the data usage service can generate the data usage records 112.

In 242, the data usage service 102 can label the data received at the communication channel with the tags associated with the communication channel. In 244, the data usage service 102 can determine the amount of data received and store the amount of network data usage in the data usage records 112 associated with the tags.

In 246, the exemplary process 220 can end, return to any point or repeat.

Figure 2D:
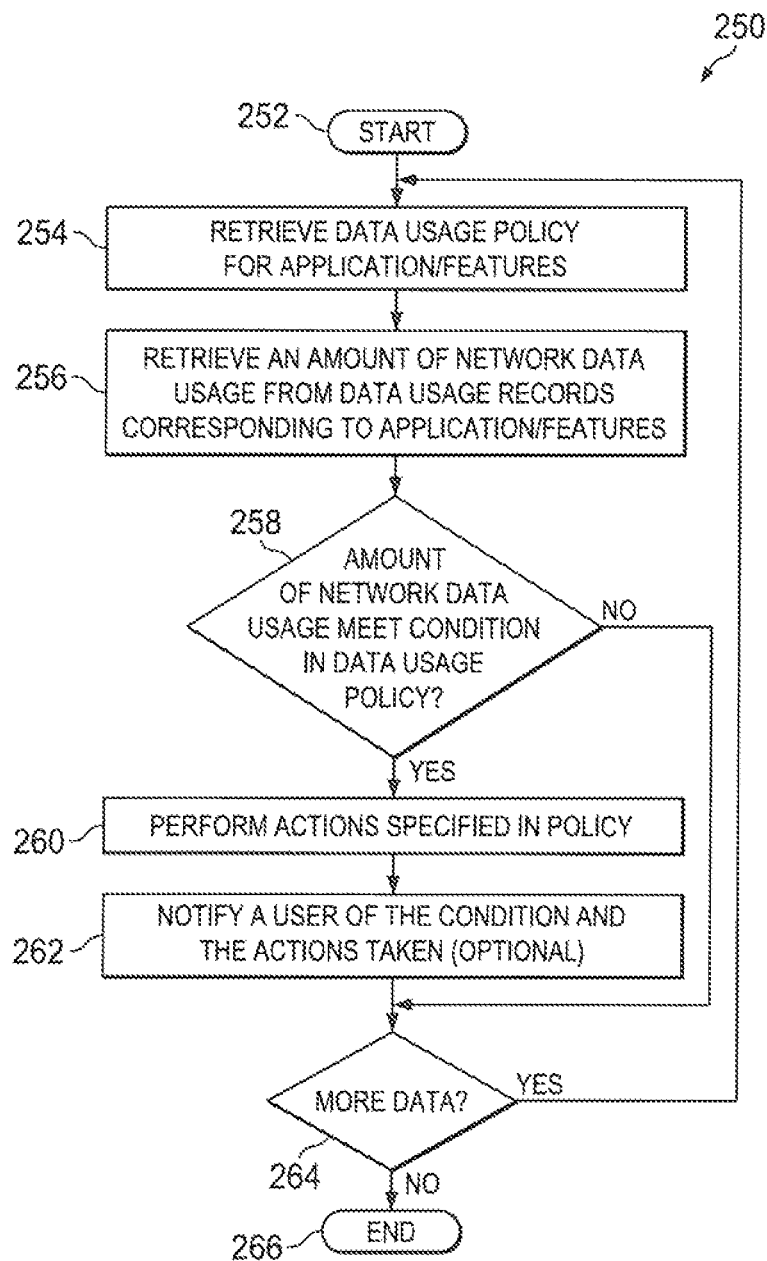

FIG. 2D illustrates an exemplary process 250 that can be performed by the data usage service 102 to control and adapt network data usage, according to embodiments. In 252, the exemplary process 250 can begin. The exemplary process 250 can begin once data is received at a communication channel that has one or more tags.

In 254, the data usage service 102 can retrieve a data usage policy for an application 106 and any features that is identified by the tags of the communication channel. The data usage service 102 can search the data usage policies record 114 with the information in the tags and retrieve any data usage polices that are applicable.

In 256, the data usage service 102 can retrieve an amount of network data usage from the data usage records 112 corresponding to the application 106 and any features of the application 106. The data usage service 102 can identify one or more of the data usage records 112 using the information in the tags. Then, the data usage service 102 can retrieve the amount of network data usage from the identified data usage records 112.

In 258, the data usage service 102 can compare the amount of network data usage to any conditions for network data usage specified in the data usage policies. For example, the condition can be a quota that specifies an amount of network data usage within a period of time. For example, a quota can specify MBytes used per day, MBytes user per week, GBytes used per month, and the like. If the amount of network data usage does not meet any conditions, the data usage service 102 can check for more data received at the communication channel in 264.

If the amount of network data usage does meets a condition, in 260, the data usage service 102 can perform any actions specified in the policies with a matching condition. The action, taken in response to the condition, can be any action associated with the application's 106 network data usage, the feature's network data usage, or both. For example, the action can include blocking or limiting the application's 106 or feature's use of one or more of the networks 104, altering the rate at which the application 106 or the feature can exchange data with one or more of the networks 104, altering the quality of service of the connection to one or more of the networks 104, switching the application's 106 or feature's connection to different ones of the networks 104.

In 262, the data usage service 102 can optionally notify a user of the computing device 100 of any conditions met and any actions taken. For example, the data usage service 102 can provide the notification in the user interface 116.

In 264, the data usage service 102 can check for more data received at the communication channel. If more data is received, the data usage service 102 can return to 254 of the exemplary process 250. If no more data is received, the exemplary process 250 can end, return to any point or repeat.

Figure 2E:
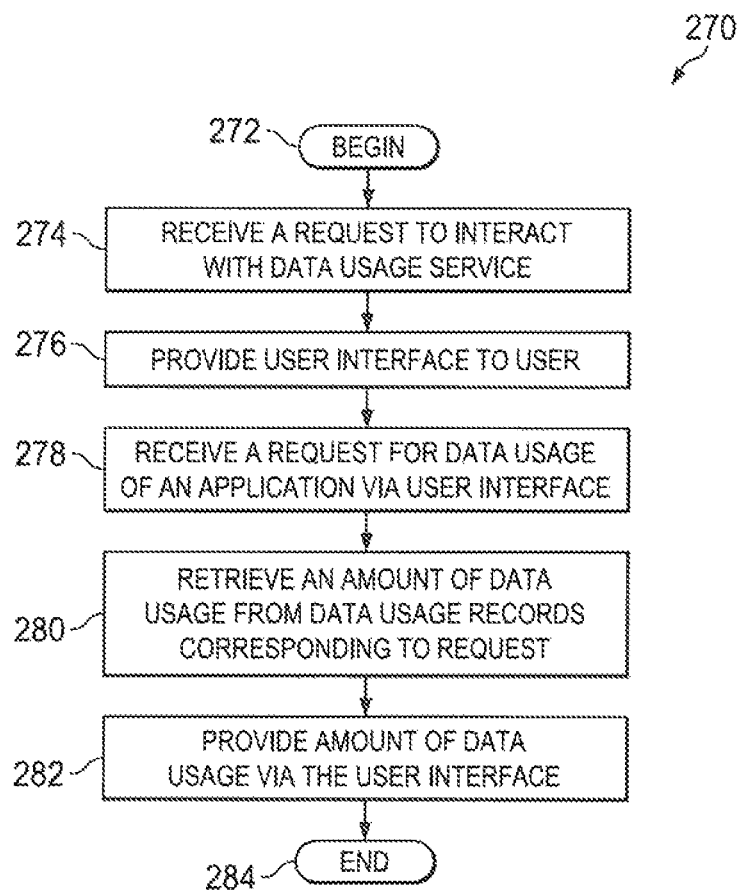

FIG. 2E illustrates an exemplary process 270 that can be performed by the data usage service 102 to report network data usage, according to embodiments. In 272, the exemplary process 270 can begin. In 274, the data usage service 102 can receive a request to interact with the data usage service 102. For example, a user of the computing device 100 can utilize the input/output hardware of the computing device 100 to provide the request.

In 276, the data usage service 102 can provide a user interface 116 to the user. The user interface 116 can be any type of user interface that allows the user to view data output by the data usage service 102 and that allows the user to interact with the data usage service 102, such as a GUI, command line interface, and the like. The data usage service 102 can provide the user interface 116 to the user via an output device, such as a display.

In 278, the data usage service 102 can receive a request for the network data usage of one or more applications 106 via the user interface 116. For example, the user can provide, via the user interface 116, a request to view the network data usage of all application 106 and the features of the applications 106. Likewise, the user can provide, via the user interface 116, a request for the network data usage of specific ones of the application 106 and the features of the applications 116. Additionally, the user can provide, via the user interface 116, a request for the network data usage for one or more of the networks 104.

In 280, the data usage service 102 can retrieve an amount of data usage from the data usage records 112 corresponding to the request. The data usage service 102 can access the data usage records 112 corresponding to the applications 106 specified in the request. Once accessed, the data usage service can retrieve the amount of data usage from the data usage records 112.

In 282, the data usage service 102 can provide the amount of network data usage via the user interface 116. The data usage service 102 can provide the amount of network data usage in any format that communicates the amount of network data usage to the user. For example, the data usage service 102 can provide the amount of network data usage in a numerical format, graphical format, and the like. In 284, the exemplary process 270 can end, return to any point or repeat.

While FIG. 2E illustrates an exemplary process for providing the user interface 116 to provide the amount of data usage to a user, the data usage service 102 can perform other exemplary processes in conjunction with the user interface 116 to provide other information about the network data usage, such as descriptions of the contexts, sub-categories, data usage policies, and the like. Likewise, the data usage service 102 can perform other exemplary processes in conjunction with the user interface 116 to receive data and information from the user, such as one or more of the applications 116 and features for which to determine network data usage, one or more of the networks 104 for which to determine network data usage, one or more data usage polices, and the like.

Figure 3A:
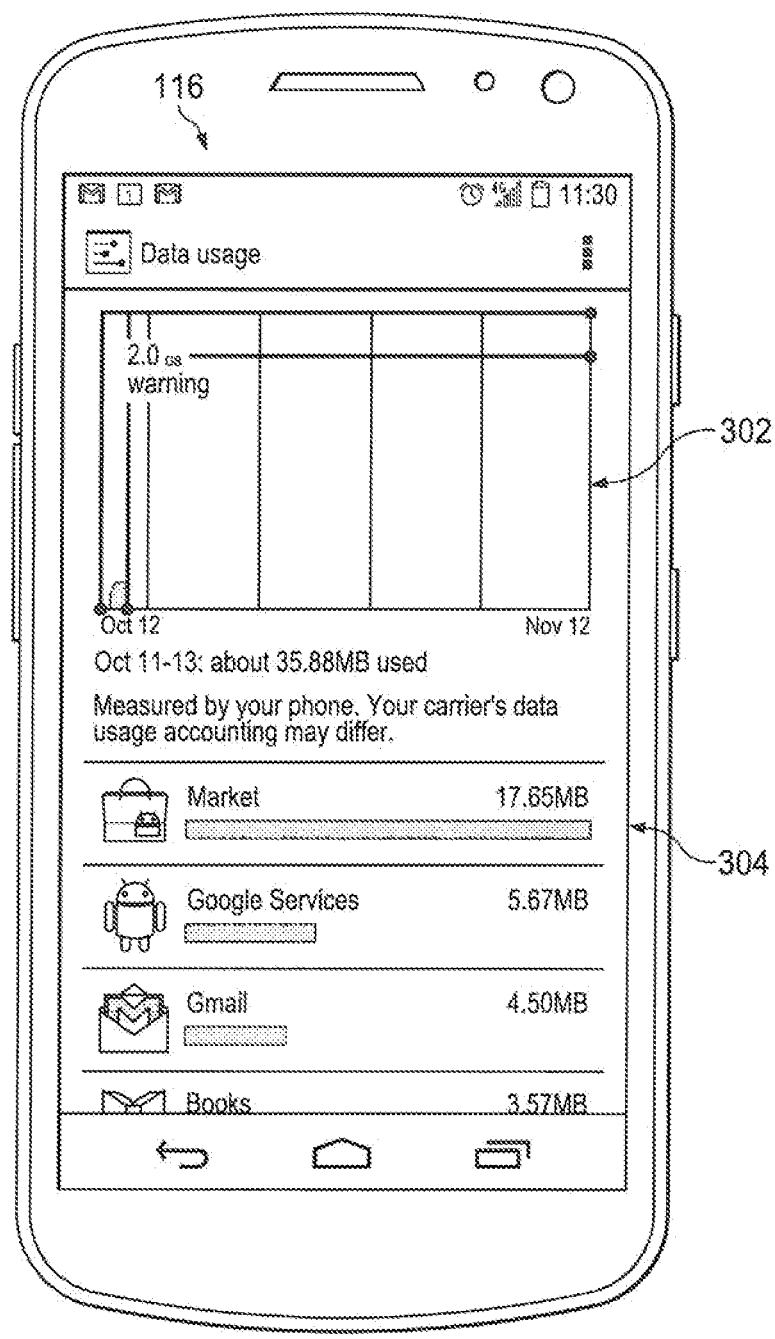
FIGS. 3A-3G are diagrams that illustrate examples of a user interface that can be provided by the data usage service according to various embodiments of the disclosure.

FIGS. 3A-3G illustrate examples of the user interface 116 that can be provided by the data usage service 102, according to various embodiments. As illustrated in FIG. 3A, the data usage service 102 can provide the user interface 116 that includes a description of the overall network data usage for one or more of the networks 104 and a breakdown of the network data usage by each application 106. For example, the user interface 116 can include a graph 302 that illustrates the overall network data usage and the conditions of network data usage at which a warning notification will be provided. Likewise, the user interface 116 can include a breakdown 304 of the network data usage by each of the applications 106.

Figure 3B:
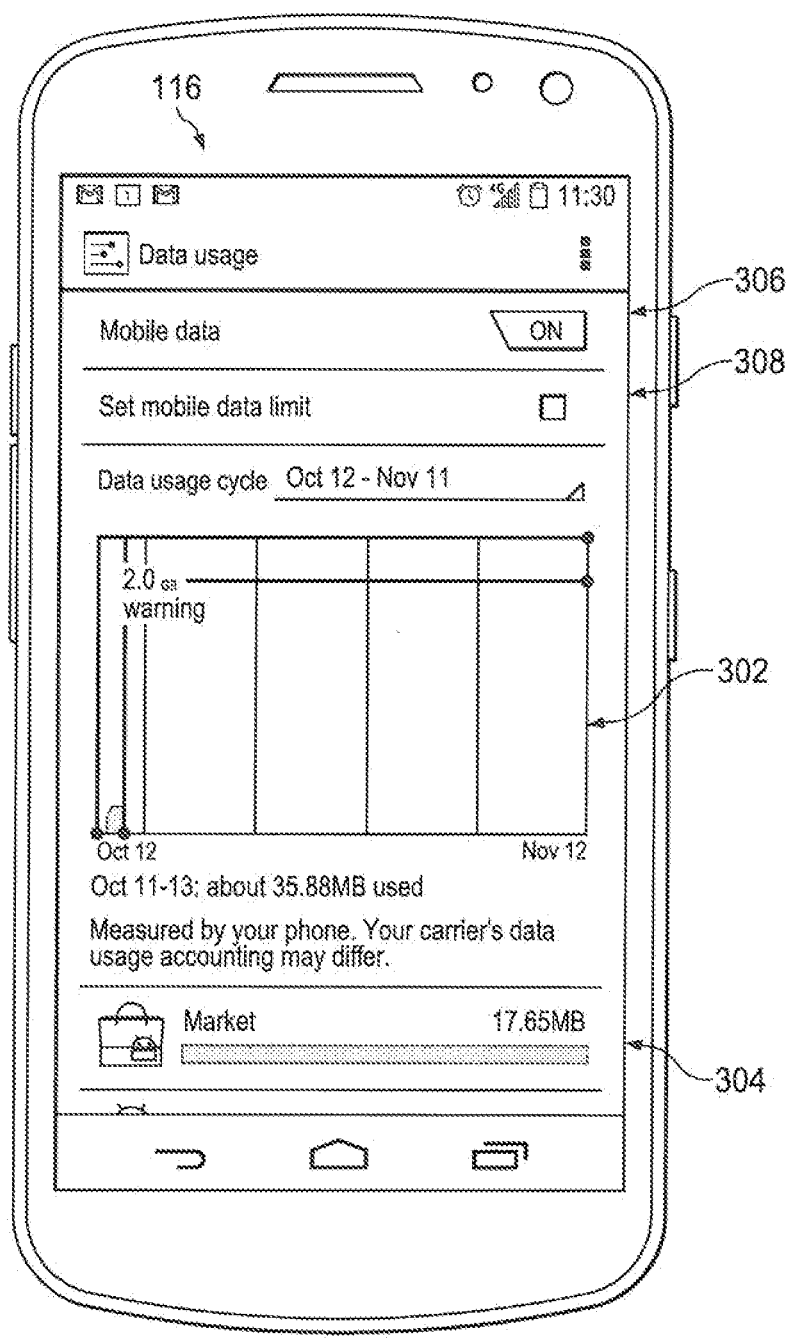
Figure 3C:
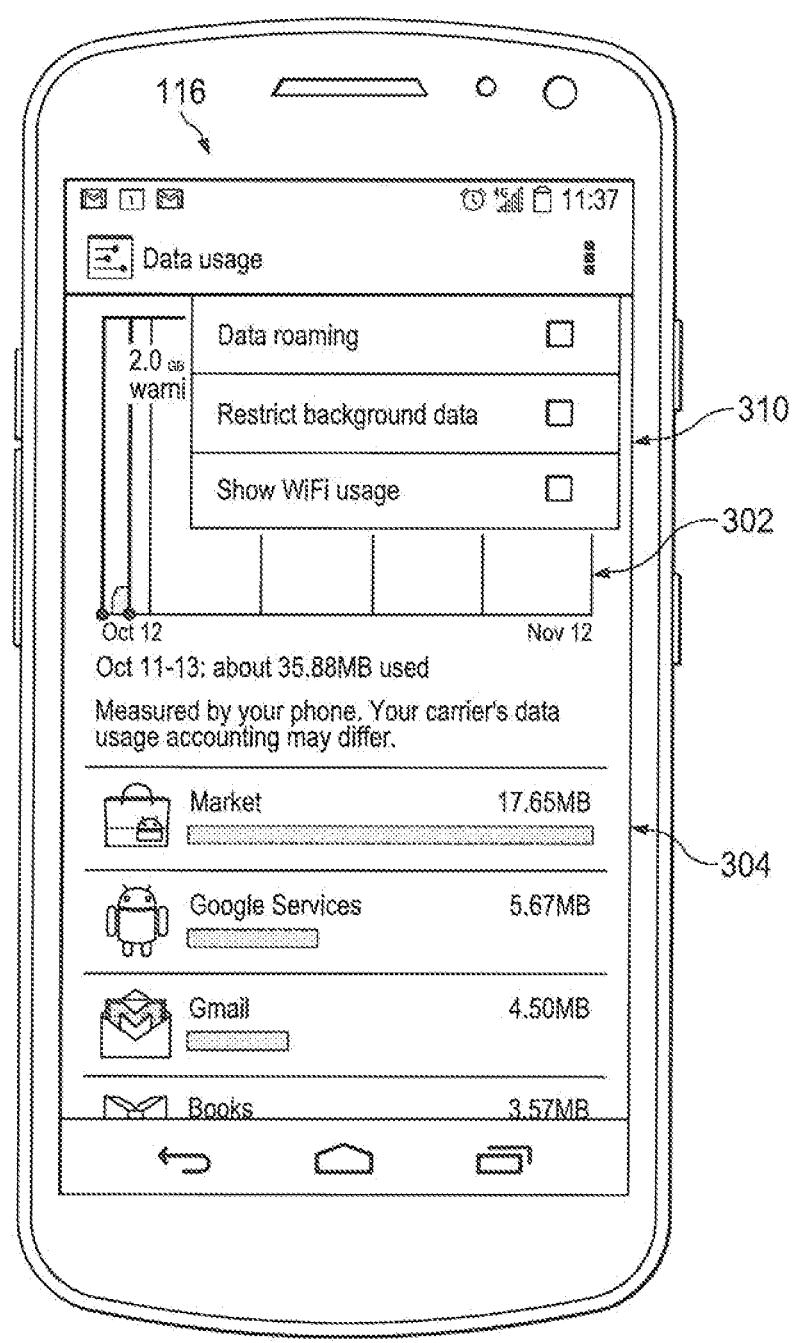
Figure 3D:
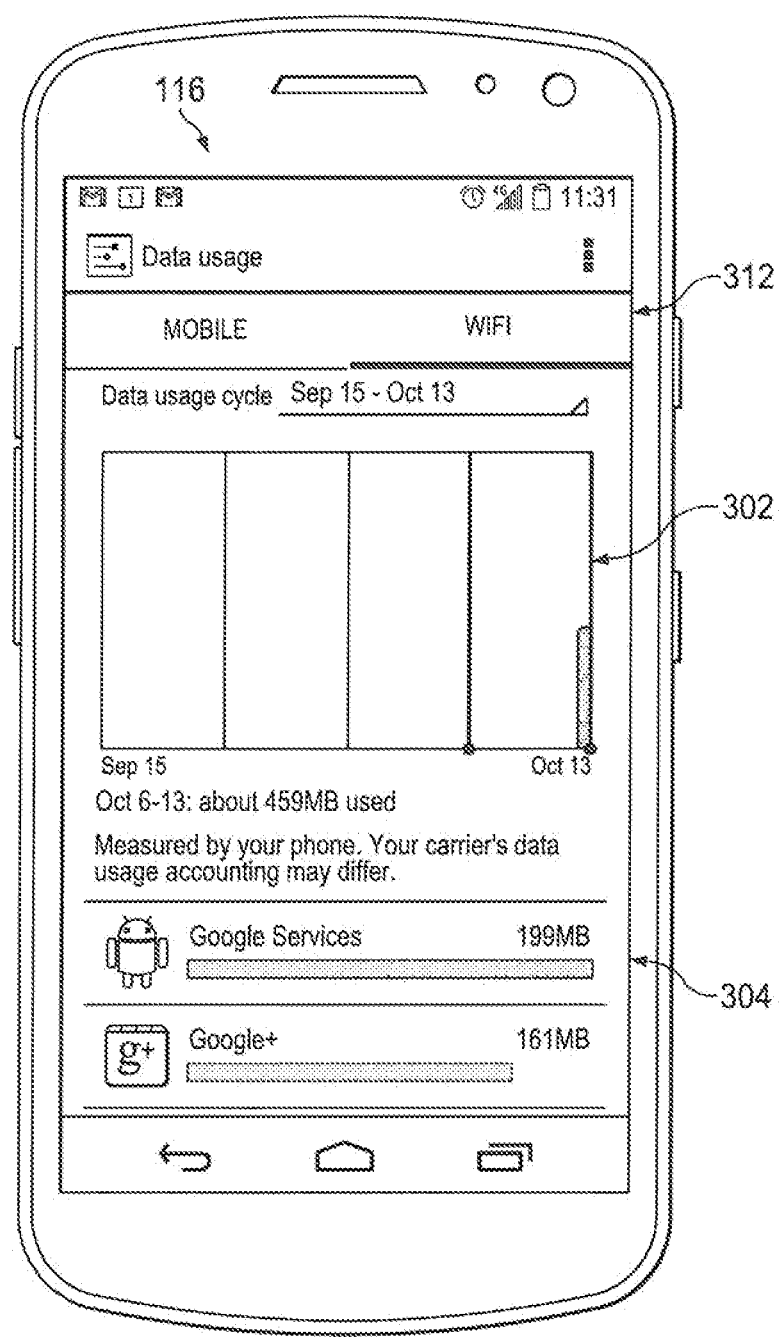

As illustrated in FIG. 3B, the data usage service 102 can also provide the user interface 116 that includes one or more widgets. The widgets can allow the user to control the data usage service 102 and provide data to the data usage service 102. For example, the user interface 116 can include a widget 306 that allows the user to activate data usage determining and control for one or more networks 104, such as a mobile network. The user interface 116 can also include a widget 308 that allows the user to set an overall data usage limit for the one or more networks 104. As illustrated in FIG. 3C, the user interface 116 can also include widget 310 that allows the user to set data usage determining for other ones of the networks 104, such as roaming mobile network; show data usage in other ones of the networks 104, such as a WiFi network; and set data usage control for different contexts, such as applications 106 running in the background. As illustrated in FIG. 3D, the user interface 116 can include a widget 312 that allows the user to select different ones of the network 104 for which to display data usage in the graph 302 and the breakdown 304.

Figure 3E:
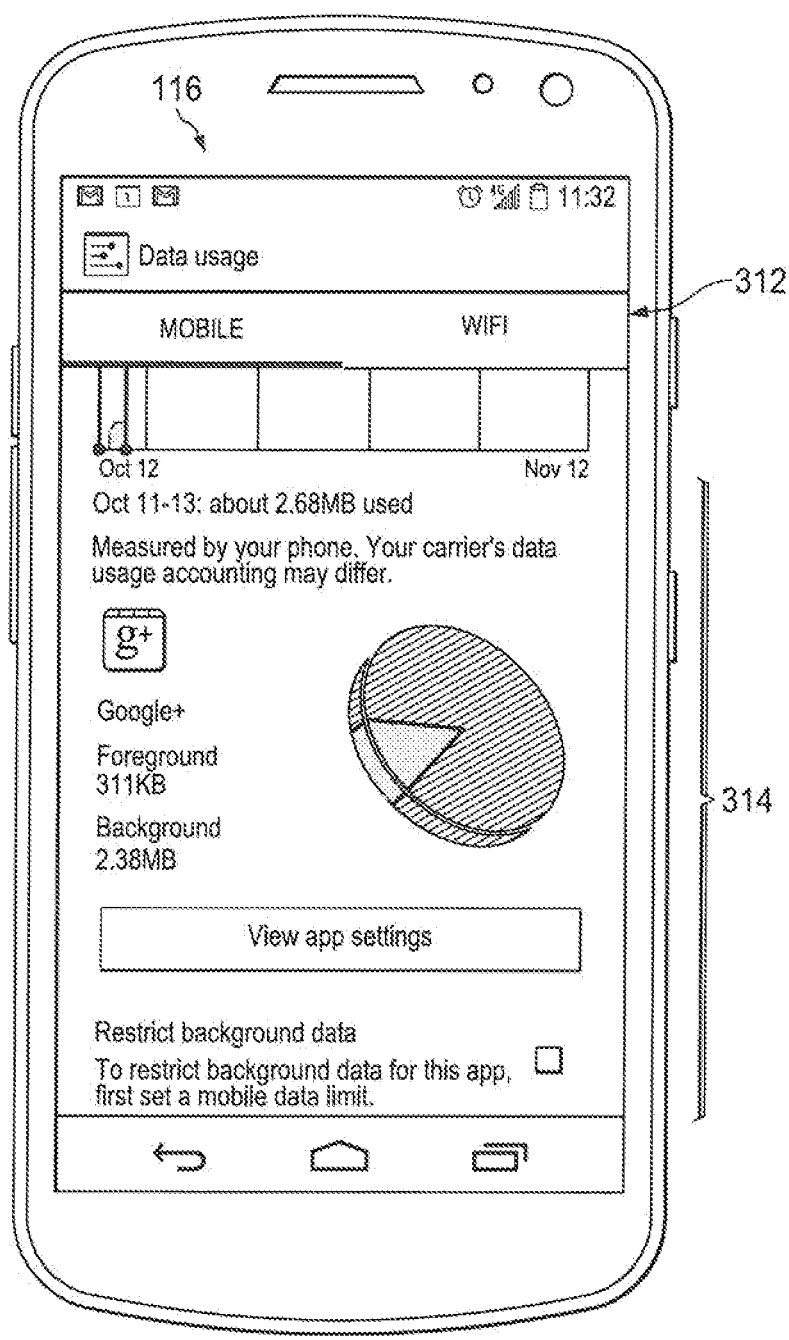
Figure 3F:
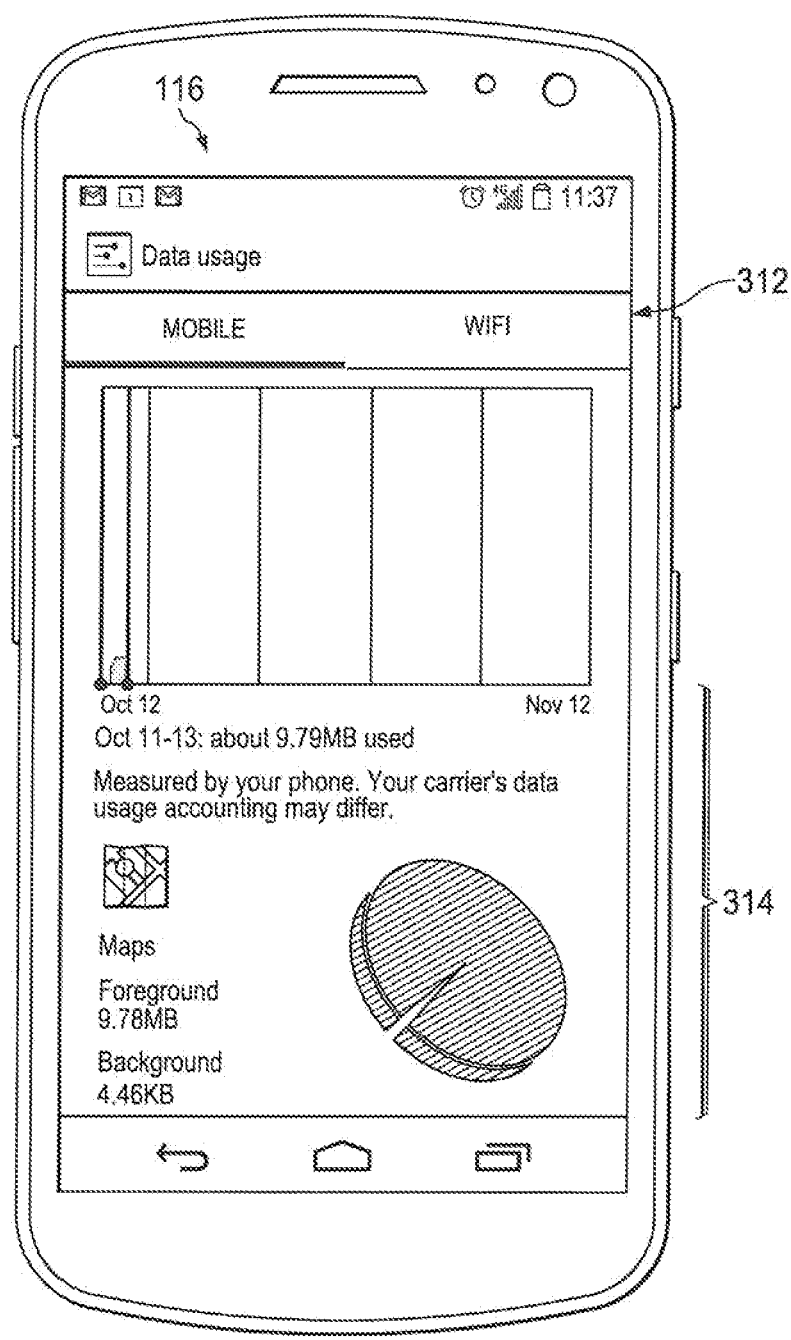

As illustrated in FIG. 3E, the user interface 116 can include a section 314 that displays the network data usage for one of the applications 106, e.g. a social networking application. The section 314 can include an overall network data usage of the social networking application in one of the networks 104 and a breakdown of the network data usage in different contexts, such as foreground and background. Additionally, the section 314 can allow the user to set data usage policies for the social networking application. The data usage service 102 can provide the section 314, in the user interface 116, in response to the user selecting a widget or link in the user interface 116. For example, the user can select one of the applications 106 displayed in the breakdown 304. FIG. 3F illustrates another section 314 showing the data usage for another one of the applications 106, for example, a map application.

Figure 3G:
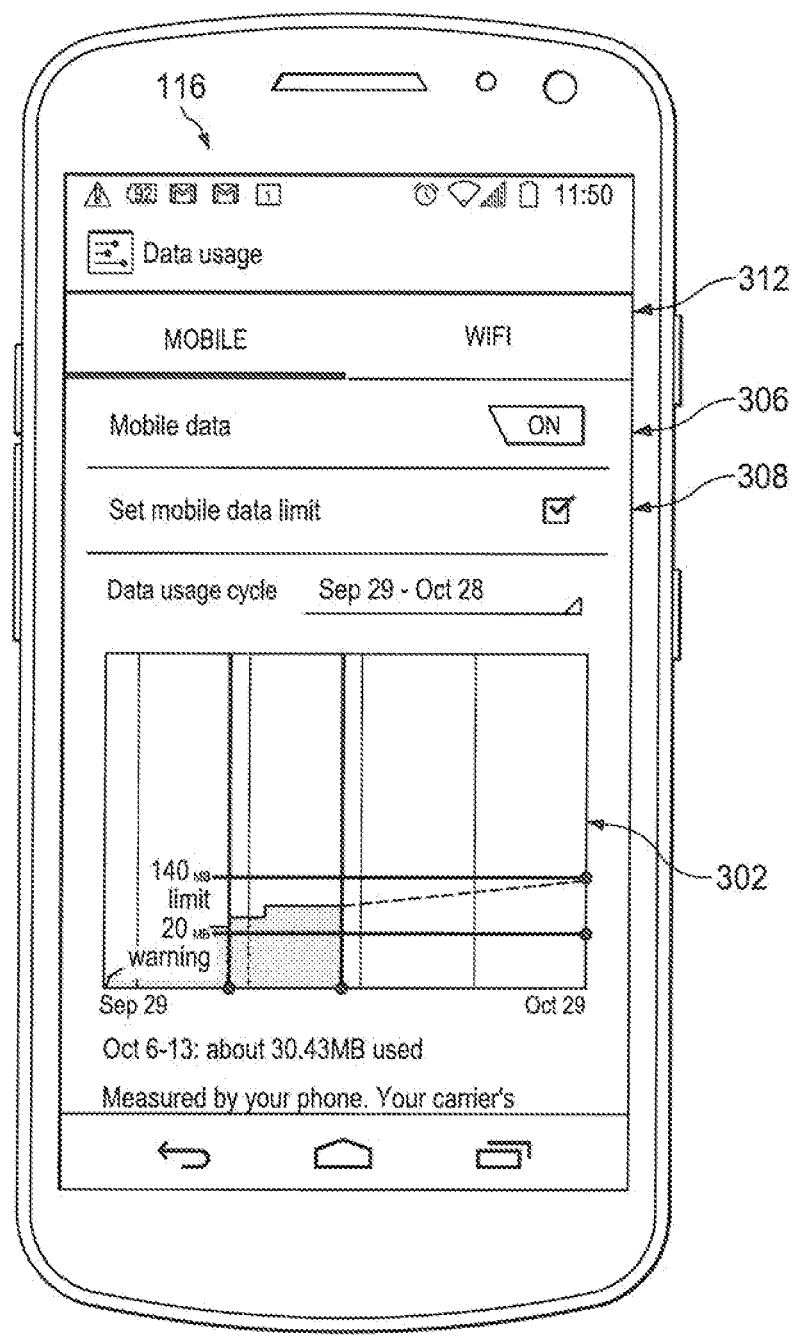

As illustrated in FIG. 3G, the data usage service 102 can provide the graph 302 as an interactive graph. The user can select sections of the graph 302 and display the network data usage for the selected time frame.

Figure 4A:
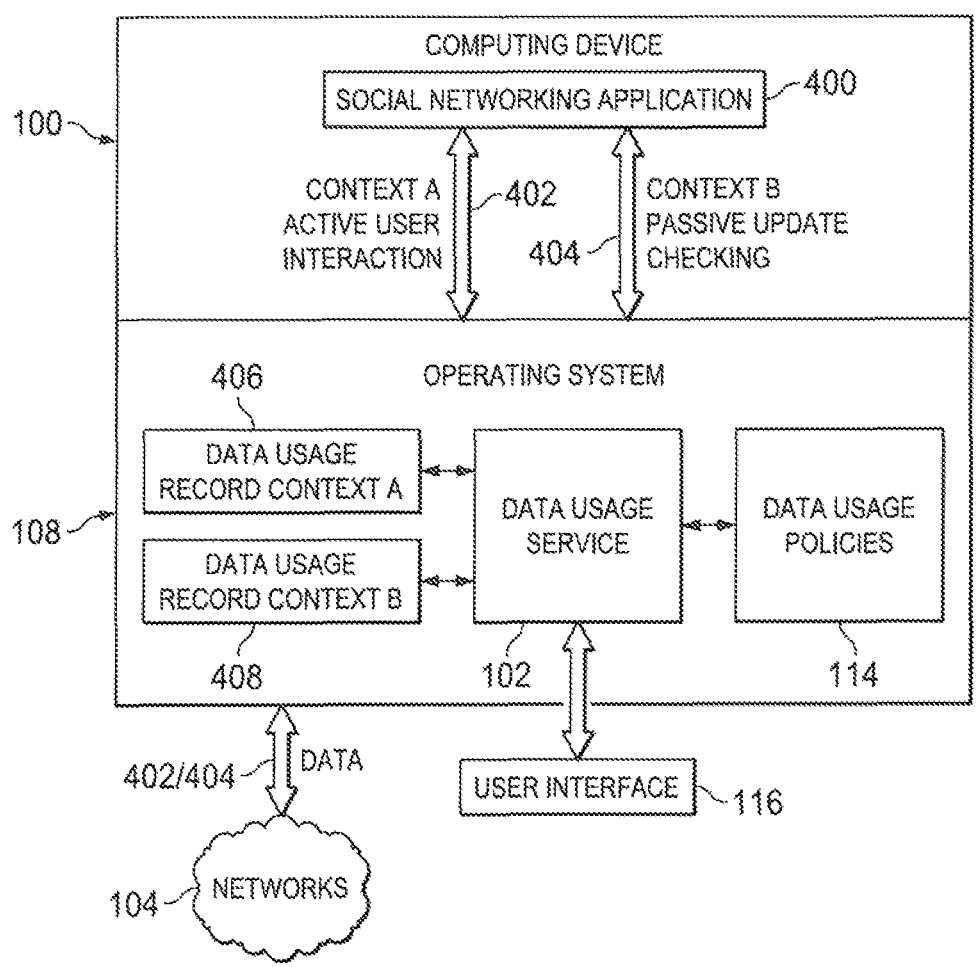

As mentioned above, the data usage service 102 can determine and control the network data usage of one or more of the applications 106 using context and sub-categories. FIGS. 4A-4C illustrate several examples of determining and controlling the network data usage by the data usage service 102, according to various embodiments. While FIGS. 4A-4C illustrate various examples of network data usage determining and control, one skilled in the art will realize that the data usage service 102 can determine and control the network data usage of any application running on the computing device 100 using any combinations of context and sub-categories.

FIG. 4A illustrates an example of determining the network data usage of a social networking application 400 running on the computing device 100. The social networking application 400 can be used by a user of the computing device 100 to access a social networking website. The social networking application 400 can run on the computing device 100 in different contexts depending on the execution state of the social networking application 400. While the user is interacting with social networking application 400, the social networking application can run in the foreground and exchange data 402 with one or more of the networks 104. Likewise, while the user is not interacting with the social networking application 400, the social networking application 400 can run in the background and exchange data 404 with one or more of the networks 104.

According to embodiments, the data usage service 102 can maintain two contexts for the different execution states of the application 106. For example, the data usage application 102 can maintain a context A for determining the network data usage of applications 106, such as the social networking application 400, running in the foreground. For instance, as the user actively interacts with the social networking application 400, the social networking application 400 can run in the foreground and exchange the data 402 with one or more of the networks 104. Likewise, the data usage application 102 can maintain a context B for the applications 106 running in the background. For instance, the social networking application 400 runs in the background as the social networking application 400 passively checks for updates and exchanges the data 404 with one or more of the networks 104.

As the social networking application 400 exchanges the data 402 and the data 404, the data usage service 102 can utilize two separate data usage records: a data usage record 406 for determining the data 402 exchanged in context A and a data usage record 408 for determining the data 404 exchanged in the context 1B. To properly attribute the data to the correct context, the data usage service 102 can associate different tags with a communication channel being utilized by the social networking application 400 as the context changes. The tags associated with the communication channel can identify the current context of the social networking application 400, e.g. running in foreground or background. As the data 402 or 404 is received at the communication channel, the data usage service 102 can identify the context from the tags and record the network data usage in the data usage records 406 or the data usage record 408 based on the tag currently associated with the communication channel. As such, the data usage service 102 can accurately account for the network data usage of the social networking application 400 in both context A and B, as well as the overall network data usage of the social networking application 400.

In this example, the data usage service 102 can control and adapt the network data usage of the social networking application 400 based on overall network data usage of the social networking application 400, the network data usage in context A, and the network data usage in context B. For instance, the data usage service 102 can utilize a policy that governs the overall network data usage of the social networking application 400, a policy that governs the network data usage in context A, and a policy that governs the network data usage in context B. For example, if the network data usage in the context B is considered less important, the policy for the context B can specify that the context B has a lower quota than context A and can specify that the data 404 is limited, blocked, given less priority, or transferred over a different one of the networks 104 when the quota is reached.

Likewise, in another example, the policy for the context B can specify that the applications 106, e.g. the social networking application 400, running in the context B, e.g. the background, can only utilize a specific one of the networks 104. For instance, the policy for the context B can specify that the applications running in the context B can only utilize a WiFi network.

FIG. 4B illustrates an example of determining the network data usage of a media player 420 running on the computing device 100. In this example, the media player 420 can utilize another application, a media server 422, to exchange data 424 with one or more of the networks 104. In order to properly attribute the exchange of the data 424 to the media player 420, the media player 422 can associate the tag 426 with the communication channel. As such, when the data 422 is determined by the data usage service 102, the data usage service 102 can properly store the amount of network data usage in a data usage record 428 for the media player 420. As such, the data 424 can be attributed with the media player 420 even though the OS 108 or the data usage service 102 may assume the media server 422 is exchanging data with one or more of the networks 104.

FIG. 4C illustrates an example of an email application 440 running on the computing device 100. In this example, the email application 440 can have different features for sending and receiving email. For instance, the email application 440 can include a feature that normally sends and receives email data 442. Likewise, the email application 440 can include a feature that speculative pre-fetches email attachments 444, even if the user has not decided to view the attachments. When developing the email application 440, the developer can realize that the pre-fetch of email attachments 444 can create a large amount of network data usage because email attachments typically include a large amount of data. As such, the developer can assign a sub-category to the pre-fetch of email attachment 444.

As the email applications 440 exchanges the data 442 and the data 444, the data usage service 102 can utilize two separate data usage records: a data usage record 446 for determining all the data exchanged by the email application 440 and a data usage record 448 for determining the data 444 exchanged by the sub-category of the speculative pre-fetching of attachments 444. To properly attribute the data, the data usage service 102 can associate different tags with a communication channel being utilized by the email application depending on which features of the email application 440 are exchanging data. The tags associated with the communication channel can identify the current features exchanging data.

For instance, as the email application exchanges data 442 with one or more of the networks 104, the data usage service 102 can label the communication channel with a tag for the email application 440 and record the network data usage in the data usage record 446. As the email application exchanges data 444 with one or more of the networks 104, the data usage service 102 can label the communication channel with a tag for the email application 440 and a tag for the sub-category of the speculative pre-fetching of attachments 444. The data usage service 102 can record the network data usage in the data usage record 446 and the data usage record 448. As such, the data usage service 102 can accurately account for the network data usage of the speculative pre-fetching of attachments of the emails application 440, as well as the overall network data usage of the email application 440.

In this example, the data usage service 102 can control and adapt the network data usage of the email application 440 based on overall network data usage of the email application 440 and the network data usage of the feature of speculative pre-fetching of attachments 444. For instance, the data usage service 102 can utilize a policy that governs the overall network data usage of the email application 400 and a policy that governs the network data usage of the feature of speculative pre-fetching of attachments 444.

Figure 5:
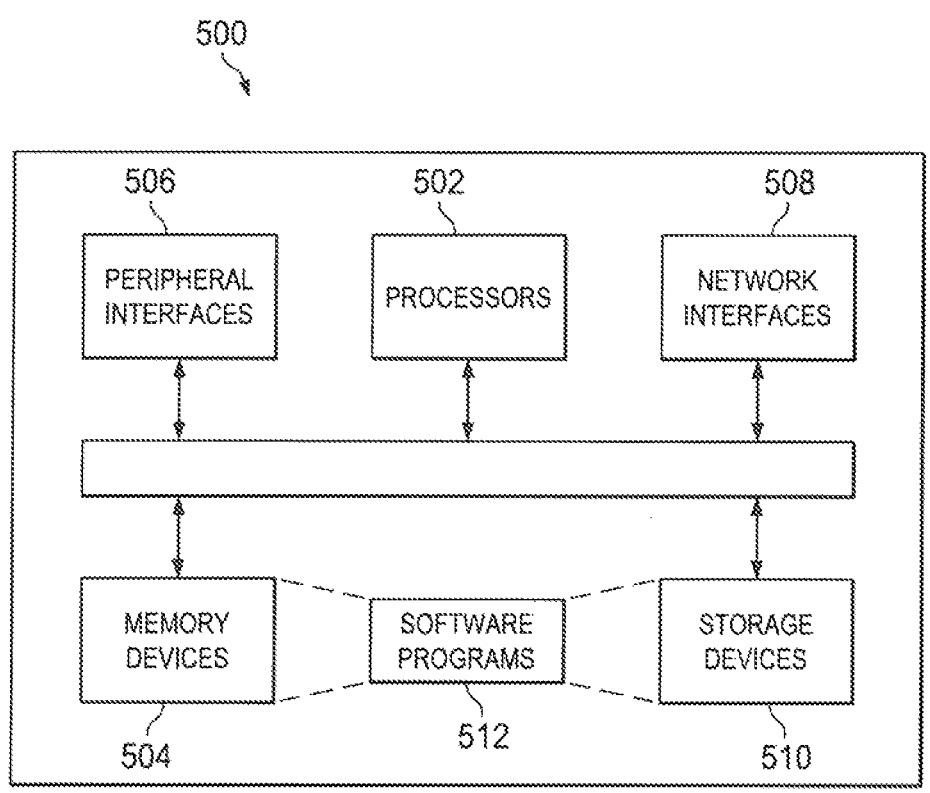
FIG. 5 is a block diagram of an example of a computing device, according to various embodiments.

FIG. 5 is a diagram depicting an exemplary hardware configuration for a computing device 500, such as the computing device 100, that may be used to perform one or more of the processes described above. While FIG. 5 illustrates various components contained in the computing device 500, one skilled in the art will realize that FIG. 5 is one example of a computing device and that additional components can be added and existing components can be removed.

As illustrated in FIG. 5, the computing device 500 can include one or more processors 502 of varying core configurations and clock frequencies. The computing device 500 can also include one or more memory devices 504 that serve as a main memory during the operation of the computing device 500. The computing device 500 can also include one or more peripheral interfaces 506, such as keyboards, mice, touchpads, computer screens, touchscreens, etc., for enabling human interaction with and manipulation of the computing device 500.

The computing device 500 can also include one or more network interfaces 508 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc. The computing device 500 can also include one or more storage device 510 of varying physical dimensions and storage capacities, such as flash drives, hard drives, random access memory, etc., for storing data, such as images, files, and program instructions for execution by the one or more processors 502. One or more software programs 512 can be stored in the one or more memory devices 504 and/or on in the one or more storage devices 510. For example, the one or more software program can include the OS 108, the data usage service 102, and any other software program utilized by the computing device 100.

Certain embodiments described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method for reporting data usage in a computing device, comprising:
   receiving a request to provide an indication of network data usage by a first data exchange feature of a plurality of features for an application exchanging data with a network;
   identifying a record that stores the network data usage of the first data exchange feature of the application based on a tag associated with the record, wherein the tag identifies the first data exchange feature of the application;
   retrieving an amount of the network data usage from the record, wherein the amount of the network data usage was determined from a communication channel of a connection across the network that is associated with the tag;
   receiving a sub-category for the data being exchanged over the connection, wherein the sub-category relates to a second data exchange feature of the plurality of features for the application;
   identifying a second record that stores network data usage of the second data exchange feature of the application based on a second tag associated with the second record, wherein the second tag identifies the second data exchange feature of the application;
   retrieving an amount of the network data usage from the second record, wherein the amount of the network data usage was determined from a communication channel of the connection across the network that is associated with the second tag; and
   providing a user interface that displays the amount of the network data usage stored in the record and the amount of the network data usage stored in the second record.

2. The method of claim 1, the method further comprising:
   providing a notification that the amount of the network data usage stored in the record exceeds a quota of allowed network data usage.

3. The method of claim 1, the method further comprising:
   receiving, via the user interface, a policy governing data being exchanged over the network.

4. The method of claim 1, wherein a second application associates the tag with the communication channel, wherein the second application provides network services to the application.

5. The method of claim 1, the method further comprising:
   identifying at least one context associated with the application;
   determining a portion of the amount of network data usage associated with the at least one context; and
   providing, in the user interface, the portion of the amount of network data usage and an indication of the at least one context.

6. A method for reporting data usage in a computing device, comprising:
   receiving a request to provide an indication of network data usage by at least one data exchange feature of an application that is associated with a context and exchanging data with networks, wherein the context comprises at least one of a manner within which the at least one application is running on the computing device, a type of the networks, and a user-defined context;
   identifying at least one record that stores the network data usage of the at least one data exchange feature of the application based on a tag associated with the record, wherein the tag identifies the context;
   retrieving an amount of the network data usage from the at least one record, wherein the amount of the network data usage was determined from a communication channel of a connection across the network that is associated with the tag;
   receiving a sub-category for the data being exchanged over the connection, wherein the sub-category relates to a second data exchange feature of the application;
   identifying a second record that stores network data usage of the second data exchange feature of the application based on a second tag associated with the second record, wherein the second tag identifies the second data exchange feature of the application;
   retrieving an amount of the network data usage from the second record, wherein the amount of the network data usage was determined from a communication channel of the connection across the network that is associated with the second tag; and
   providing a user interface that displays the amount of the network data usage stored in the record, the amount of the network data usage stored in the second record, and an identification of the at least one application.

7. The method of claim 6, wherein the context is defined by the application running in a foreground when the application is receiving input via the user interface.

8. A computer readable storage medium embodying instructions for causing a processor to perform a method comprising:
   receiving a request to provide an indication of network data usage by a first data exchange feature of a plurality of features for an application exchanging data with a network;
   identifying a record that stores the network data usage of the first data exchange feature of the application based on a tag associated with the record, wherein the tag identifies the first data exchange feature of the application;
   retrieving an amount of the network data usage from the record, wherein the amount of the network data usage was determined from a communication channel of a connection across the network that is associated with the tag;
   receiving a sub-category for the data being exchanged over the connection, wherein the sub-category relates to a second data exchange feature of the plurality of features for the application;
   identifying a second record that stores network data usage of the second data exchange feature of the application based on a second tag associated with the second record, wherein the second tag identifies the second data exchange feature of the application;

retrieving an amount of the network data usage from the second record, wherein the amount of the network data usage was determined from a communication channel of the connection across the network that is associated with the second tag; and providing a user interface that displays the amount of the network data usage stored in the record and the amount of the network data usage stored in the second record.

9. The computer readable storage medium of claim 8, the method further comprising:

providing a notification that the amount of the network data usage stored in the record exceeds a quota of allowed network data usage.

10. The computer readable storage medium of claim 8, the method further comprising:

receiving, via the user interface, a policy governing data being exchanged over the network.

11. The computer readable storage medium of claim 8, wherein a second application associates the tag with the communication channel, wherein the second application provides network services to the application.

12. The computer readable storage medium of claim 8, the method further comprising:

identifying at least one context associated with the application;

determining a portion of the amount of network data usage associated with the at least one context; and providing, in the user interface, the portion of the amount of network data usage and an indication of the at least one context.

13. A computer readable storage medium embodying instructions for causing a processor to perform a method comprising:

receiving a request to provide an indication of network data usage by at least one data exchange feature of an application that is associated with a context and exchanging data with networks, wherein the context comprises at least one of a manner within which the at least one application is running on the computing device, a type of the networks, and a user-defined context;

identifying at least one record that stores the network data usage of the at least one data exchange feature of the application based on a tag associated with the record, wherein the tag identifies the context;

retrieving an amount of the network data usage from the at least one record, wherein the amount of the network data usage was determined from a communication channel of a connection across the network that is associated with the tag;

receiving a sub-category for the data being exchanged over the connection, wherein the sub-category relates to a second data exchange feature of the application;

identifying a second record that stores network data usage of the second data exchange feature of the application based on a second tag associated with the second record, wherein the second tag identifies the second data exchange feature of the application;

retrieving an amount of the network data usage from the second record, wherein the amount of the network data usage was determined from a communication channel of the connection across the network that is associated with the second tag; and providing a user interface that displays the amount of the network data usage stored in the record, the amount of the network data usage stored in the second record, and an identification of the at least one application.

14. The computer readable storage medium of claim 13, wherein the context is defined by the application running in a foreground when the application is receiving input via the user interface.

15. A computing device for reporting data usage, comprising:

a processor; and a computer readable storage medium coupled to the processor and comprising instructions for causing the processor to perform a method comprising:

receiving a request to provide an indication of network data usage by a first data exchange feature of a plurality of features for an application exchanging data with a network;

identifying a record that stores the network data usage of the first data exchange feature of the application based on a tag associated with the record, wherein the tag identifies the first data exchange feature of the application;

retrieving an amount of the network data usage from the record, wherein the amount of the network data usage was determined from a communication channel of a connection across the network that is associated with the tag;

receiving a sub-category for the data being exchanged over the connection, wherein the sub-category relates to a second data exchange feature of the plurality of features for the application;

identifying a second record that stores network data usage of the second data exchange feature of the application based on a second tag associated with the second record, wherein the second tag identifies the second data exchange feature of the application;

retrieving an amount of the network data usage from the second record, wherein the amount of the network data usage was determined from a communication channel of the connection across the network that is associated with the second tag; and providing a user interface that displays the amount of the network data usage stored in the record and the amount of the network data usage stored in the second record.

16. The computing device of claim 15, the method further comprising:

providing a notification that the amount of the network data usage stored in the record exceeds a quota of allowed network data usage.

17. The computing device of claim 15, the method further comprising:

receiving, via the user interface, a policy governing data being exchanged over the network.

18. The computing device of claim 15, wherein a second application associates the tag with the communication channel, wherein the second application provides network services to the application.

19. The computing device of claim 15, the method further comprising:

identifying at least one context associated with the application;

determining a portion of the amount of network data usage associated with the at least one context; and providing, in the user interface, the portion of the amount of network data usage and an indication of the at least one context.

20. The computing device of claim 19, wherein the context is defined by the application running in a foreground when the application is receiving input via the user interface.

21. A computing device for reporting data usage, comprising:
 a processor; and
 a computer readable storage medium coupled to the processor and comprising instructions for causing the processor to perform a method comprising:
  receiving a request to provide an indication of network data usage by at least one data exchange feature of an application that is associated with a context and exchanging data with networks, wherein the context comprises at least one of a manner within which the at least one application is running on the computing device, a type of the networks, and a user-defined context;
  identifying at least one record that stores the network data usage of the at least one data exchange feature of the application based on a tag associated with the record, wherein the tag identifies the context;
  retrieving an amount of the network data usage from the at least one record, wherein the amount of the network data usage was determined from a communication channel of a connection across the network that is associated with the tag;
  receiving a sub-category for the data being exchanged over the connection, wherein the sub-category relates to a second data exchange feature of the application;
  identifying a second record that stores network data usage of the second data exchange feature of the application based on a second tag associated with the second record, wherein the second tag identifies the second data exchange feature of the application;
  retrieving an amount of the network data usage from the second record, wherein the amount of the network data usage was determined from a communication channel of the connection across the network that is associated with the second tag; and
  providing a user interface that displays the amount of the network data usage stored in the record, the amount of the network data usage stored in the second record, and an identification of the at least one application.

* * * * *